US012687987B2

(12) United States Patent
Chen et al.

(10) Patent No.: US 12,687,987 B2
(45) Date of Patent: Jul. 21, 2026

(54) MEMORY CONTROL METHOD, MEMORY STORAGE DEVICE, AND MEMORY CONTROL CIRCUIT UNIT

(71) Applicant: PHISON ELECTRONICS CORP., Miaoli (TW)

(72) Inventors: Xing Yu Chen, Hsinchu County (TW); Ting Wei Chen, Hsinchu City (TW)

(73) Assignee: PHISON ELECTRONICS CORP., Miaoli (TW)

( * ) Notice: Subject to any disclaimer, the term of this patent is extended or adjusted under 35 U.S.C. 154(b) by 89 days.

(21) Appl. No.: 18/805,539

(22) Filed: Aug. 15, 2024

(65) Prior Publication Data

US 2026/0044282 A1　　Feb. 12, 2026

(30) Foreign Application Priority Data

Aug. 7, 2024　(TW) .................................. 113129607

(51) Int. Cl.
G06F 3/06 (2006.01)

(52) U.S. Cl.
CPC .......... G06F 3/0659 (2013.01); G06F 3/0604 (2013.01); G06F 3/0679 (2013.01)

(58) Field of Classification Search
CPC ..... G06F 3/0659; G06F 3/0604; G06F 3/0679
See application file for complete search history.

(56) References Cited

U.S. PATENT DOCUMENTS

| | | | | |
|---|---|---|---|---|
| 9,886,214 | B2 * | 2/2018 | Micheloni | G06F 3/0604 |
| 10,643,711 | B1 * | 5/2020 | Yuan | G11C 16/32 |
| 2020/0303012 | A1 * | 9/2020 | Nishikawa | G11C 16/349 |
| 2021/0142855 | A1 * | 5/2021 | Na | G11C 7/1084 |
| 2021/0373795 | A1 * | 12/2021 | Lee | G06F 3/0688 |
| 2023/0244383 | A1 * | 8/2023 | Kanno | G06F 3/0605 |
| | | | | 711/103 |
| 2023/0360708 | A1 * | 11/2023 | Shukla | G11C 16/3445 |

FOREIGN PATENT DOCUMENTS

TW　　　　202223632　　　6/2022

OTHER PUBLICATIONS

"Office Action of Taiwan Counterpart Application", issued on Aug. 15, 2025, p. 1-p. 7.

* cited by examiner

*Primary Examiner* — Hiep T Nguyen
(74) *Attorney, Agent, or Firm* — JCIPRNET

(57) ABSTRACT

A memory control method, a memory storage device, and a memory control circuit unit for a rewritable non-volatile memory module are provided. The method includes: judging a load level of the rewritable non-volatile memory module; determining a suspend interval between a plurality of suspend commands according to the load level; and sequentially issuing the suspend commands to the rewritable non-volatile memory module according to the suspend interval. The suspend commands are configured to suspend an operation currently executed by the rewritable non-volatile memory module to execute a read operation. A time interval from an end of the read operation to receiving a next suspend command is greater than or equal to the suspend interval.

21 Claims, 8 Drawing Sheets

MEMORY CONTROL METHOD, MEMORY STORAGE DEVICE, AND MEMORY CONTROL CIRCUIT UNIT

CROSS-REFERENCE TO RELATED APPLICATION

This application claims the priority benefit of Taiwan application serial no. 113129607, filed on Aug. 7, 2024. The entirety of the above-mentioned patent application is hereby incorporated by reference herein and made a part of this specification.

BACKGROUND

Technical Field

The disclosure relates to a memory control method, and in particular to a memory control method, a memory storage device, and a memory control circuit unit for adjusting a suspend command interval.

Description of Related Art

Portable electronic devices such as mobile phones and notebook computers have grown rapidly in the past few years, which has led to a rapid increase in consumer demand for storage media. As the rewritable non-volatile memory module (for example, a flash memory) has characteristics such as non-volatile data, power saving, small volume, and no mechanical structure, the rewritable non-volatile memory module is very suitable for being built into various portable electronic devices exemplified above.

The rewritable non-volatile memory module may perform operations such as writing (also referred to as programming), reading, and erasing. However, the read operation cannot be performed when the erase or write operation is performed. Some rewritable non-volatile memory modules may also receive a suspend command. If the suspend command is received when performing the write or erase operation, the currently executed write or erase operation will be temporarily paused to prioritize performing the operation of reading, and then return to the write or erase operation. In order to prevent the write or erase operation from being frequently suspended, it may be set such that a time interval must elapse after receiving the suspend command before receiving the next suspend command. At this time, the length of the time interval affects the performance of various operations.

SUMMARY

The disclosure provides a memory control method, a memory storage device, and a memory control circuit unit, which can dynamically determine a suspend interval between multiple suspend commands according to a load level of a rewritable non-volatile memory module, so as reduce latency of reading commands to improve the overall performance of the system.

An embodiment of the disclosure provides a memory control method for a rewritable non-volatile memory module. The rewritable non-volatile memory module includes multiple physical units. The method includes: judging a load level of the rewritable non-volatile memory module; determining a suspend interval between multiple suspend commands according to the load level; and sequentially issuing the suspend commands to the rewritable non-volatile memory module according to the suspend interval. The suspend commands are configured to suspend an operation currently executed by the rewritable non-volatile memory module to execute a read operation. A time interval from an end of the read operation to receiving a next one of the suspend commands is longer than or equal to the suspend interval.

In an embodiment, the memory control method further includes: judging whether the load level of the rewritable non-volatile memory module is a light load or a heavy load. The step of determining the suspend interval between the suspend commands according to the load level includes: if the load level is the light load, reducing the suspend interval; and if the load level is the heavy load, increasing the suspend interval.

In an embodiment, the operation is an erase operation, and the suspend interval is an erase suspend interval. The step of judging whether the load level of the rewritable non-volatile memory module is the light load or the heavy load includes: receiving a write command from a host system and storing the write command in a buffer memory; when a free memory space of the buffer memory is greater than or equal to a first buffer threshold, judging the load level to be the light load; and when the free memory space of the buffer memory is less than or equal to a second buffer threshold, judging the load level to be the heavy load. The second buffer threshold is less than the first buffer threshold.

In an embodiment, the memory control method further includes: when the free memory space of the buffer memory is less than the first buffer threshold and greater than the second buffer threshold, maintaining the suspend interval unchanged.

In an embodiment, the operation is a write operation, and the suspend interval is a write suspend interval. The step of judging whether the load level of the rewritable non-volatile memory module is the light load or the heavy load includes: receiving a command from a host system, and adding the command to a command queue; if an occupancy rate of the command queue is greater than a first queue threshold, judging the load level to be the heavy load; and if the occupancy rate of the command queue is less than a second queue threshold, judging the load level to be the light load.

In an embodiment, the operation is a write operation, and the suspend interval is a write suspend interval. The step of judging whether the load level of the rewritable non-volatile memory module is the light load or the heavy load includes: calculating a write speed of a host system; if the write speed is less than a first write speed threshold, judging the load level to be the light load; and if the write speed is greater than a second writing threshold, judging the load level to be the heavy load.

In an embodiment, when the rewritable non-volatile memory module returns to the operation from the suspend command, the rewritable non-volatile memory module executes the operation after a warm-up time. The memory control method further includes: in response to a number of multiple read commands issued by a host system being greater than a number of multiple write commands, setting the suspend interval to be less than the warm-up time.

From another perspective, an embodiment of the disclosure provides a memory storage device, including: a connection interface unit, configured to couple to a host system; a rewritable non-volatile memory module, including multiple physical units; and a memory control circuit unit coupled to the connection interface unit and the rewritable non-volatile memory module. The memory control circuit unit is configured to execute multiple steps of: judging a load level of the rewritable non-volatile memory module; determining a suspend interval between multiple suspend commands according to the load level; and sequentially issuing the suspend commands to the rewritable non-volatile memory modules according to the suspend interval. The suspend commands are configured to suspend an operation currently executed by the rewritable non-volatile memory module to execute a read operation. A time interval from an end of the read operation to receiving a next one of the suspend commands is longer than or equal to the suspend interval.

From another perspective, an embodiment of the disclosure provides a memory control circuit unit configured to control a rewritable non-volatile memory module, which includes multiple physical units. The memory control circuit unit includes: a host interface, configured to couple to a host system; a memory interface, configured to couple to the rewritable non-volatile memory module; a memory management circuit, coupled to the host interface and the memory interface. The memory management circuit is configured to execute multiple steps of: judging a load level of the rewritable non-volatile memory module; determining a suspend interval between multiple suspend commands according to the load level; and sequentially issuing the suspend commands to the rewritable non-volatile memory modules according to the suspend interval. The suspend commands are configured to suspend an operation currently executed by the rewritable non-volatile memory module to execute a read operation. A time interval from an end of the read operation to receiving a next one of the suspend commands is longer than or equal to the suspend interval.

In order for the features and advantages of the disclosure to be more comprehensible, the following specific embodiments are described in detail in conjunction with the drawings.

DESCRIPTION OF THE EMBODIMENTS

Figure 1:
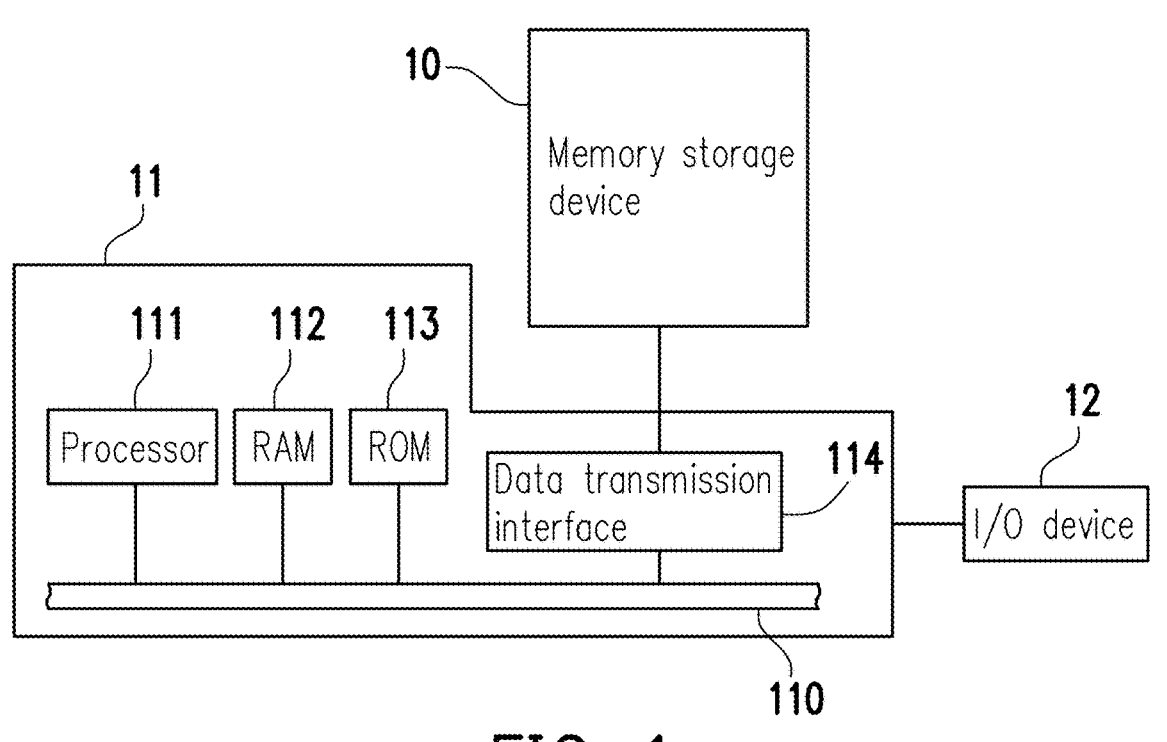
FIG. 1 is a schematic diagram of a host system, a memory storage device, and an input/output (I/O) device according to an exemplary embodiment of the disclosure.

Some embodiments of the disclosure will be described in detail below with reference to the drawings. The reference numerals cited in the following description will be regarded as referring to the same or similar elements when the same reference numerals appear in different drawings. The embodiments are only a part of the disclosure and do not disclose all possible implementations of the disclosure. Rather, the embodiments are merely examples of systems and methods within the scope of the disclosure.

Terms such as "first" and "second" used in the disclosure do not specifically refer to the order or the sequence, but are only used to distinguish elements or operations described with the same technical terms.

Generally speaking, a memory storage device (also referred to as a memory storage system) includes a rewritable non-volatile memory module and a controller (also referred to as a control circuit). The memory storage device may be used together with a host system, so that the host system may write data to the memory storage device or read data from the memory storage device.

Figure 2:
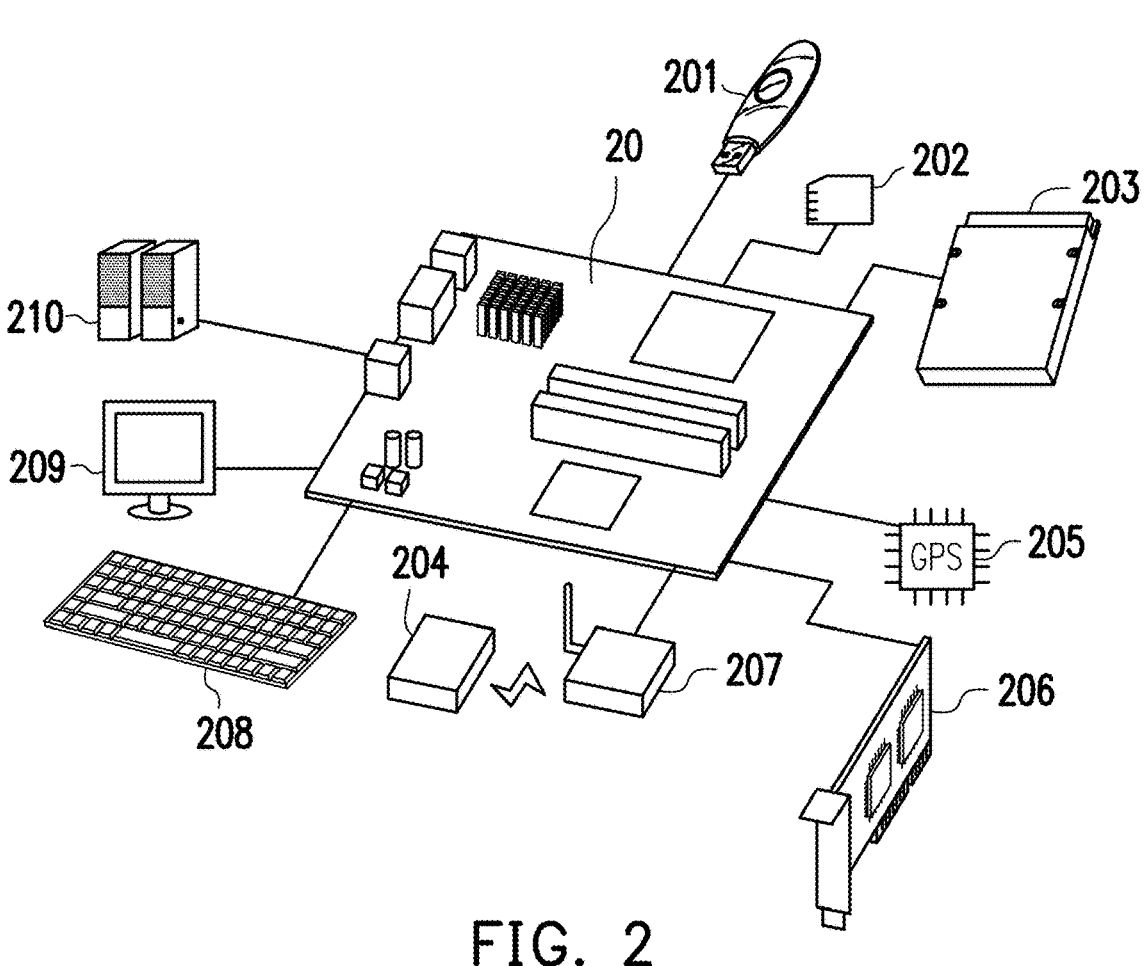
FIG. 2 is a schematic diagram of a host system, a memory storage device, and an I/O device according to an exemplary embodiment of the disclosure.

FIG. 1 is a schematic diagram of a host system, a memory storage device, and an input/output (I/O) device according to an exemplary embodiment of the disclosure. FIG. 2 is a schematic diagram of a host system, a memory storage device, and an I/O device according to an exemplary embodiment of the disclosure.

Please refer to FIG. 1 and FIG. 2. A host system 11 may include a processor 111, a random access memory (RAM) 112, a read only memory (ROM) 113, and a data transmission interface 114. The processor 111, the random access memory 112, the read only memory 113, and the data transmission interface 114 may be coupled to a system bus 110.

In an exemplary embodiment, the host system 11 may be coupled to a memory storage device 10 through the data transmission interface 114. For example, the host system 11 may store data in the memory storage device 10 or read data from the memory storage device 10 via the data transmission interface 114. In addition, the host system 11 may be coupled to the I/O device 12 through the system bus 110. For example, the host system 11 may send an output signal to the I/O device 12 or receive an input signal from the I/O device 12 via the system bus 110.

In an exemplary embodiment, the processor 111, the random access memory 112, the read only memory 113, and the data transmission interface 114 may be disposed on a motherboard 20 of the host system 11. The number of the data transmission interface 114 may be one or more. Through the data transmission interface 114, the motherboard 20 may be coupled to the memory storage device 10 via a wired or wireless manner.

In an exemplary embodiment, the memory storage device 10 may be, for example, a flash drive 201, a memory card 202, a solid state drive (SSD) 203, or a wireless memory storage device 204. The wireless memory storage device 204 may be, for example, a near field communication (NFC) memory storage device, a WiFi memory storage device, a Bluetooth memory storage device, a low-power Bluetooth memory storage device (for example, iBeacon), or other memory storage devices based on various wireless communication technologies. In addition, the motherboard 20 may also be coupled to a global positioning system (GPS) module 205, a network interface card 206, a wireless transmission device 207, a keyboard 208, a screen 209, a speaker 210, or various other I/O devices through the system bus 110. For example, in an exemplary embodiment, the motherboard 20 may access the wireless memory storage device 204 through the wireless transmission device 207.

In an exemplary embodiment, the host system 11 is a computer system. In an exemplary embodiment, the host system 11 may be any system that may substantially cooperate with a memory storage device to store data. In an exemplary embodiment, the memory storage device 10 and the host system 11 may respectively include a memory storage device 30 and a host system 31 of FIG. 3.

Figure 3:
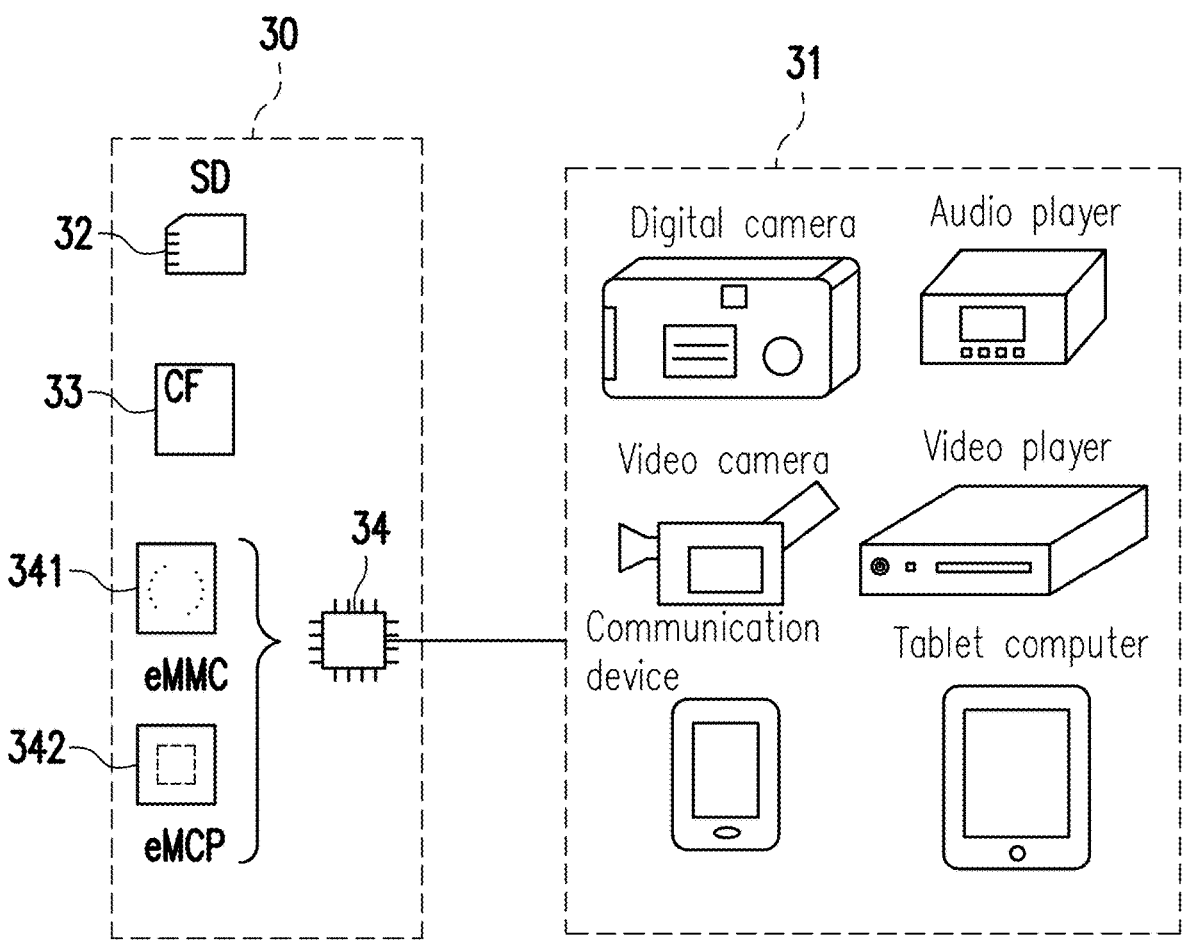
FIG. 3 is a schematic diagram of a host system and a memory storage device according to an exemplary embodiment of the disclosure.

FIG. 3 is a schematic diagram of a host system and a memory storage device according to an exemplary embodiment of the disclosure. Please refer to FIG. 3. The memory storage device 30 may be used in conjunction with the host system 31 to store data. For example, the host system 31 may be a digital camera, a video camera, a communication device, an audio player, a video player, a tablet computer, or other systems. For example, the memory storage device 30 may be a secure digital (SD) card 32, a compact flash (CF) card 33, an embedded storage device 34, or various other non-volatile memory storage devices used by the host system 31. The embedded storage device 34 includes an embedded multi media card (eMMC) 341, an embedded multi chip package (eMCP) storage device 342, and/or various other embedded storage devices in which a memory module is directly coupled onto a substrate of a host system.

Figure 4:
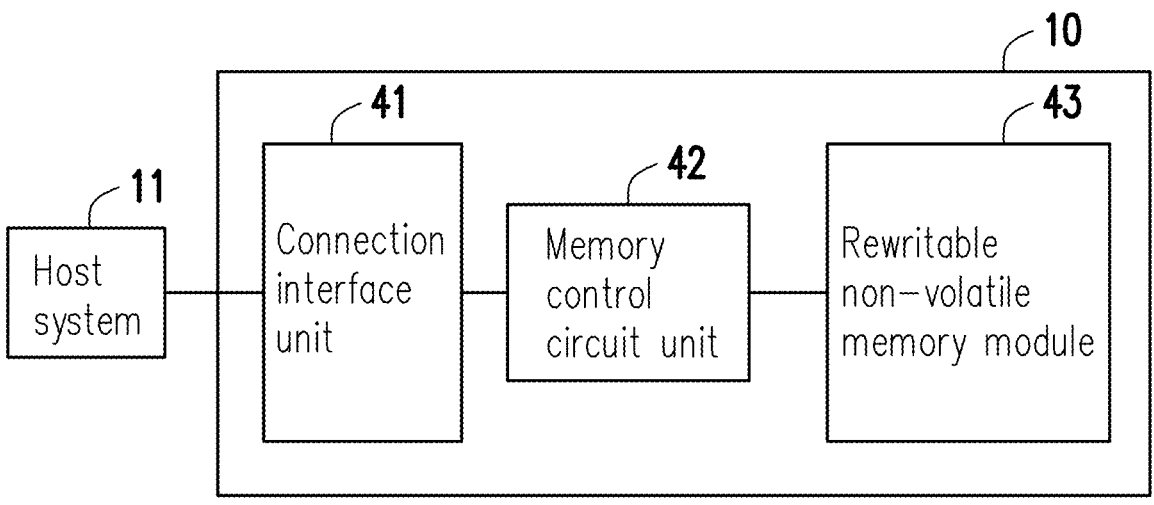
FIG. 4 is a schematic diagram of a memory storage device according to an exemplary embodiment of the disclosure.

FIG. 4 is a schematic diagram of a memory storage device according to an exemplary embodiment of the disclosure. Please refer to FIG. 4. The memory storage device 10 includes a connection interface unit 41, a memory control circuit unit 42, and a rewritable non-volatile memory module 43.

The connection interface unit 41 is configured to couple the memory storage device 10 to the host system 11. The memory storage device 10 may communicate with the host system 11 via the connection interface unit 41. In an exemplary embodiment, the connection interface unit 41 is compatible with the peripheral component interconnect express (PCI express) standard. In an exemplary embodiment, the connection interface unit 41 may also conform to the serial advanced technology attachment (SATA) standard, the parallel advanced technology attachment (PATA) standard, the Institute of Electrical and Electronic Engineers (IEEE) 1394 standard, the universal serial bus (USB) standard, the SD interface standard, the ultra high speed-I (UHS-I) interface standard, the ultra high speed-II (UHS-II) interface standard, the memory stick (MS) interface standard, the MCP interface standard, the MMC interface standard, the eMMC interface standard, the universal flash storage (UFS) interface standard, the eMCP interface standard, the CF interface standard, the integrated device electronics (IDE) standard, or other suitable standards. The connection interface unit 41 and the memory control circuit unit 42 may be packaged in one chip, or the connection interface unit 41 may be arranged outside a chip including the memory control circuit unit 42.

The memory control circuit unit 42 is coupled to the connection interface unit 41 and the rewritable non-volatile memory module 43. The memory control circuit unit 42 is configured to execute multiple logic gates or control commands implemented in the form of hardware or the form of firmware and perform operations such as data writing, reading, and erasing in the rewritable non-volatile memory module 43 according to a command of the host system 11.

The rewritable non-volatile memory module 43 is configured to store data written by the host system 11. The rewritable non-volatile memory module 43 may include a single level cell (SLC) NAND flash memory module (that is, a flash memory module that may store 1 bit in a memory cell), a multi level cell (MLC) NAND flash memory module (that is, a flash memory module that may store 2 bits in a memory cell), a triple level cell (TLC) NAND flash memory module (that is, a flash memory module that may store 3 bits in a memory cell), a quad level cell (QLC) NAND flash memory module (that is, a flash memory module that may store 4 bits in a memory cell), other flash memory modules, or other memory modules with the same characteristics.

Each memory cell in the rewritable non-volatile memory module 43 stores one or more bits with changes in voltage (hereinafter also referred to as a threshold voltage). Specifically, there is a charge trapping layer between a control gate and a channel of each memory cell. Through applying a write voltage to the control gate, the number of electrons in the charge trapping layer may be changed, thereby changing the threshold voltage of the memory cell. The operation of changing the threshold voltage of the memory cell is also referred to as "writing data to the memory cell" or "programming the memory cell". As the threshold voltage changes, each memory cell in the rewritable non-volatile memory module 43 has multiple storage states. It is possible to judge which storage state a memory cell belongs to through applying a read voltage, so as to obtain one or more bits stored in the memory cell.

In an exemplary embodiment, the memory cells of the rewritable non-volatile memory module 43 may constitute multiple physical programming units, and the physical programming units may constitute multiple physical erasing units. Specifically, the memory cells on the same word line may form one or more physical programming units. If one memory cell may store more than 2 bits, the physical programming units on the same word line may be at least classified into a lower physical programming unit and an upper physical programming unit. For example, a least significant bit (LSB) of a memory cell belongs to the lower physical programming unit, and a most significant bit (MSB) of a memory cell belongs to the upper physical programming unit. Generally speaking, in the MLC NAND flash memory, the write speed of the lower physical programming unit is greater than the write speed of the upper physical programming unit and/or the reliability of the lower physical programming unit is higher than the reliability of the upper physical programming unit.

In an exemplary embodiment, the physical programming unit is the smallest unit of programming. That is, the physical programming unit is the smallest unit of writing data. For example, the physical programming unit may be a physical page or a physical sector. If the physical programming unit is a physical page, the physical programming units may include a data bit area and a redundancy bit area. The data bit area includes multiple physical sectors for storing user data, and the redundancy bit area is configured to store system data (for example, management data such as an error correcting code). In an exemplary embodiment, the data bit area includes 32 physical sectors, and the size of one physical sector is 512 bytes (B). However, in other exemplary embodiments, the data bit area may also include 8, 16, more, or less physical sectors, and the size of each physical sector may also be greater or smaller. On the other hand, the physical erasing unit is the smallest unit of erasure. That is, each physical erasing unit includes the smallest number of memory cells to be erased together. For example, the physical erasing unit is a physical block.

Figure 5:
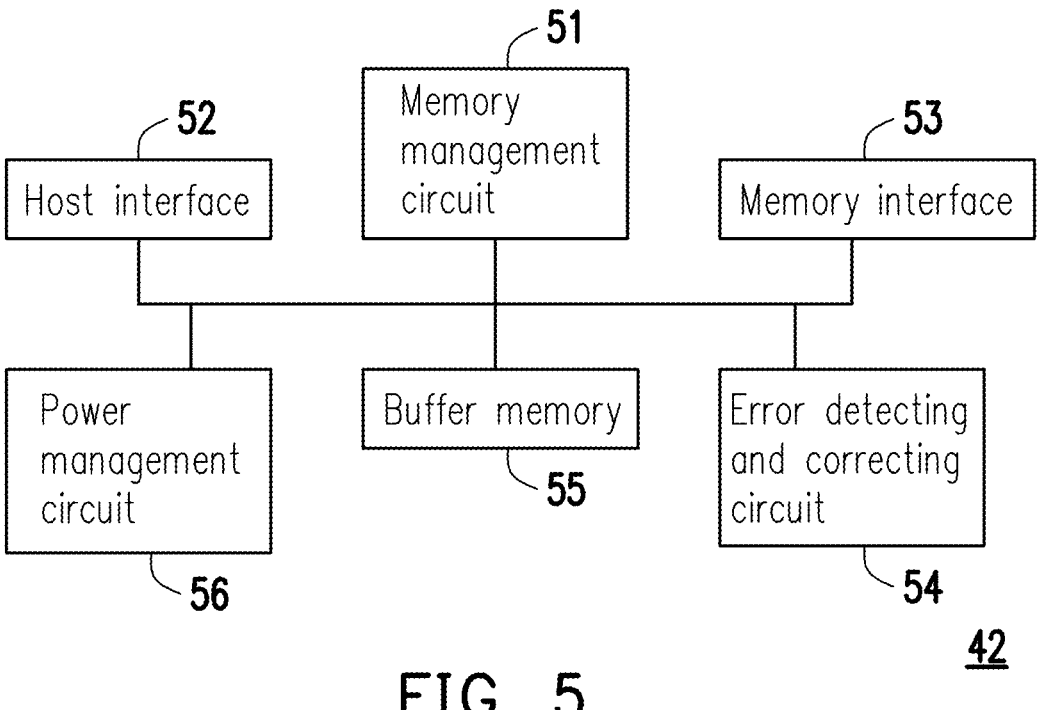
FIG. 5 is a schematic diagram of a memory control circuit unit according to an exemplary embodiment of the disclosure.

FIG. 5 is a schematic diagram of a memory control circuit unit according to an exemplary embodiment of the disclosure. Please refer to FIG. 5. The memory control circuit unit 42 includes a memory management circuit 51, a host interface 52, and a memory interface 53.

The memory management circuit 51 is configured to control the overall operation of the memory control circuit unit 42. Specifically, the memory management circuit 51 has multiple control commands, and when the memory storage device 10 is operating, the control commands are executed to perform operations such as data writing, reading, and erasing. The following description of the operation of the memory management circuit 51 is equivalent to the description of the operations of the memory control circuit unit 42 and the memory storage device 10.

In an exemplary embodiment, the control commands of the memory management circuit 51 are implemented in the form of firmware. For example, the memory management circuit 51 has a microprocessor unit (not shown) and a read only memory (not shown), and the control commands are burnt into the read only memory. When the memory storage device 10 is operating, the control commands are executed by the microprocessor unit to perform operations such as data writing, reading, and erasing.

In an exemplary embodiment, the control commands of the memory management circuit 51 may also be stored in a specific region (for example, a system area dedicated to storing system data in a memory module) of the rewritable non-volatile memory module 43 in the form of program codes. In addition, the memory management circuit 51 has a microprocessor unit (not shown), a read only memory (not shown), and a random access memory (not shown). In particular, the read only memory has a boot code, and when the memory control circuit unit 42 is enabled, the microprocessor unit first executes the boot code to load the control commands stored in the rewritable non-volatile memory module 43 into the random access memory of the memory management circuit 51. After that, the microprocessor unit runs the control commands to perform operations such as data writing, reading, and erasing.

In an exemplary embodiment, the control commands of the memory management circuit 51 may also be implemented in the form of hardware. For example, the memory management circuit 51 includes a microcontroller, a memory cell management circuit, a memory write circuit, a memory read circuit, a memory erase circuit, and a data processing circuit. The memory cell management circuit, the memory write circuit, the memory read circuit, the memory erase circuit, and the data processing circuit are coupled to the microcontroller. The memory cell management circuit is configured to manage a memory cell or a memory cell group of the rewritable non-volatile memory module 43. The memory write circuit is configured to issue a write command sequence to the rewritable non-volatile memory module 43 to write data to the rewritable non-volatile memory module 43. The memory read circuit is configured to issue a read command sequence to the rewritable non-volatile memory module 43 to read data from the rewritable non-volatile memory module 43. The memory erase circuit is configured to issue an erase command sequence to the rewritable non-volatile memory module 43 to erase data from the rewritable non-volatile memory module 43. The data processing circuit is configured to process data to be written to the rewritable non-volatile memory module 43 and data read from the rewritable non-volatile memory module 43. The write command sequence, the read command sequence, and the erase command sequence may each include one or more program codes or command codes and are configured to instruct the rewritable non-volatile memory module 43 to execute corresponding operations such as writing, reading, and erasing. In an exemplary embodiment, the memory management circuit 51 may also issue other types of command sequences to the rewritable non-volatile memory module 43 to instruct to execute corresponding operations.

The host interface 52 is coupled to the memory management circuit 51. The memory management circuit 51 may communicate with the host system 11 through the host interface 52. The host interface 52 may be configured to receive and identify commands and data sent by the host system 11. For example, the commands and the data sent by the host system 11 may be sent to the memory management circuit 51 through the host interface 52. In addition, the memory management circuit 51 may send the data to the host system 11 through the host interface 52. In the exemplary embodiment, the host interface 52 is compatible with the PCI express standard. However, it must be understood that the disclosure is not limited thereto. The host interface 52 may also be compatible with the SATA standard, the PATA standard, the IEEE 1394 standard, the USB standard, the SD standard, the UHS-I standard, the UHS-II standard, the MS standard, the MMC standard, the eMMC standard, the UFS standard, the CF standard, the IDE standard, or other suitable data transmission standards.

The memory interface 53 is coupled to the memory management circuit 51 and is configured to access the rewritable non-volatile memory module 43. For example, the memory management circuit 51 may access the rewritable non-volatile memory module 43 through the memory interface 53. In other words, data to be written to the rewritable non-volatile memory module 43 is converted into a format acceptable by the rewritable non-volatile memory module 43 via the memory interface 53. Specifically, if the memory management circuit 51 intends to access the rewritable non-volatile memory module 43, the memory interface 53 will send the corresponding command sequence. For example, the command sequences may include the write command sequence instructing to write data, the read command sequence instructing to read data, the erase command sequence instructing to erase data, and corresponding command sequences instructing various memory operations (such as changing a read voltage level, executing a garbage collection (GC) operation, etc.). The command sequences are, for example, generated by the memory management circuit 51 and sent to the rewritable non-volatile memory module 43 through the memory interface 53. The command sequences may include one or more signals or data on a bus. The signals or the data may include command codes or program codes. For example, the read command sequence includes information such as a read recognition code and a memory address.

In an exemplary embodiment, the memory control circuit unit 42 further includes an error detecting and correcting circuit 54, a buffer memory 55, and a power management circuit 56.

The error detecting and correcting circuit 54 is coupled to the memory management circuit 51 and is configured to execute error detecting and correcting operations to ensure correctness of data. Specifically, when the memory management circuit 51 receives a write command from the host system 11, the error detecting and correcting circuit 54 generates a corresponding error correcting code (ECC) and/or error detecting code (EDC) for data corresponding to the write command, and the memory management circuit 51 writes the data corresponding to the write command and the corresponding error correcting code and/or error detecting code to the rewritable non-volatile memory module 43. Later, when the memory management circuit 51 reads the data from the rewritable non-volatile memory module 43, the error correcting code and/or the error detecting code corresponding to the data are read at the same time, and the error detecting and correcting circuit 54 executes the error detecting and correcting operations on the read data according to the error correcting code and/or the error detecting code. For example, the error detecting and correcting circuit 54 may adopt low density parity check (LDPC) codes, Bose-Chaudhuri-Hocquenghem (BCH) codes, Reed-Solomon (RS) codes, exclusive OR (XOR) codes, and other encoding/decoding algorithms to encode and decode the data.

The buffer memory 55 is coupled to the memory management circuit 51 and is configured to temporarily store data. The power management circuit 56 is coupled to the memory management circuit 51 and is configured to control the power of the memory storage device 10.

In an exemplary embodiment, the rewritable non-volatile memory module 43 of FIG. 4 may include a flash memory module. In an exemplary embodiment, the memory control circuit unit 42 of FIG. 4 may include a flash memory controller. In an exemplary embodiment, the memory management circuit 51 of FIG. 5 may include a flash memory management circuit.

Figure 6:
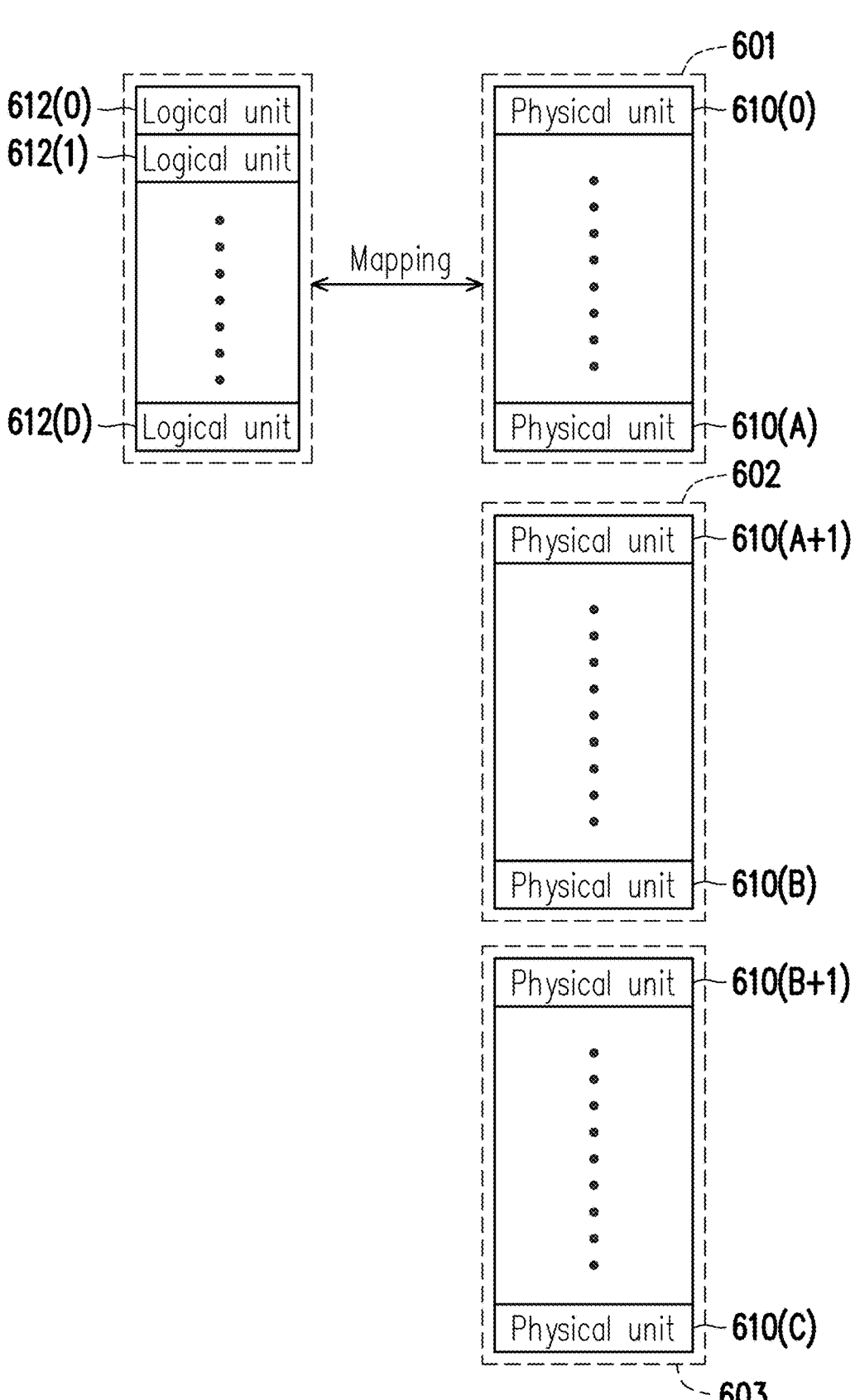
FIG. 6 is a schematic diagram of managing a rewritable non-volatile memory module according to an exemplary embodiment of the disclosure.

FIG. 6 is a schematic diagram of managing a rewritable non-volatile memory module according to an exemplary embodiment of the disclosure. Please refer to FIG. 6. The memory management circuit 51 may logically group physical units 610(0) to 610(C) in the rewritable non-volatile memory module 43 into a storage area 601, a spare area 602, and a system area 603.

In an exemplary embodiment, a physical unit refers to a physical address or a physical programming unit. In an exemplary embodiment, the physical unit may also be composed of multiple continuous or discontinuous physical addresses. In an exemplary embodiment, the physical unit may also refer to a virtual block (VB). The virtual block may include multiple physical addresses or multiple physical programming units. In an exemplary embodiment, the virtual block may include one or more physical erasing units.

In an exemplary embodiment, the physical units 610(0) to 610(A) in the storage area 601 are configured to store user data (for example, the user data of the host system 11 of FIG. 1). For example, the physical units 610(0) to 610(A) in the storage area 601 may store valid data and invalid data. The physical units 610(A+1) to 610(B) in the spare area 602 do not store data (for example, valid data). For example, if a certain physical unit does not store valid data, the physical unit may be associated with (or added to) the spare area 602. In addition, the physical units (or physical units that do not store valid data) in the spare area 602 may be erased. When writing new data, one or more physical units may be extracted from the spare area 602 to store the new data. In an exemplary embodiment, the spare area 602 is also referred to as a free pool.

In an exemplary embodiment, the memory management circuit 51 may be configured with logical units 612(0) to 612(D) to map the physical units 610(0) to 610(A) in the storage area 601. In an exemplary embodiment, each logical unit corresponds to one logical address. For example, one logical address may include one or more logical block addresses (LBA) or other logical management units. In an exemplary embodiment, one logical unit may also correspond to one logical programming unit or be composed of multiple continuous or discontinuous logical addresses.

It should be noted that one logical unit may be mapped to one or more physical units. If a certain physical unit is currently mapped by a certain logical unit, it means that data currently stored in the physical unit includes valid data.

Conversely, if a certain physical unit is not currently mapped by any logical unit, it means that data currently stored in the physical unit is invalid data.

In an exemplary embodiment, the memory management circuit 51 may record management data (also referred to as logical-to-physical mapping information) describing a mapping relationship between the logical unit and the physical unit in at least one logical-to-physical mapping table (L2P table). When the host system 11 intends to read data from the memory storage device 10 or write data to the memory storage device 10, the memory management circuit 51 may access the rewritable non-volatile memory module 43 according to information in the logical-to-physical mapping table.

In an exemplary embodiment, the memory management circuit 51 may store a specific type of data in the system area 603. For example, the physical units 610(B+1) to 610(C) in the system area 603 may be dedicated to storing data with higher importance and/or data not intended to be accessed or modified by the host system 11. For example, the data with higher importance and/or the data not intended to be accessed or modified by the host system 11 may include a logical-to-physical mapping table, a bad block management table, a wear leveling management table, a valid data management table, and/or other types of management data, which is not limited by the disclosure. The logical-to-physical mapping table is configured to record mapping information. The mapping information may reflect the mapping relationship between the logical unit and the physical unit. The bad block management table is configured to record information related to at least one bad block in the rewritable non-volatile memory module 43. The wear leveling management table may be configured to record information related to a wear state (for example, a read count, a write count, and/or an erase count) of at least one physical unit in the rewritable non-volatile memory module 43. The valid data management table may be configured to record information related to a valid count of at least one physical unit in the rewritable non-volatile memory module 43.

In an exemplary embodiment, the memory management circuit 51 may not map any logical unit to the physical unit in the system area 603. In this way, the data stored in the system area 603 may be prevented from being accessed or modified by the host system 11.

The memory management circuit 51 may generate command sequences for the rewritable non-volatile memory module 43. The command sequences may control the rewritable non-volatile memory module 43 to perform operations such as reading, writing, and erasing. The memory management circuit 51 may also issue a suspend command to the rewritable non-volatile memory module 43, so that the rewritable non-volatile memory module 43 suspends a currently executed operation and prioritizes executing a read operation.

Figure 7:
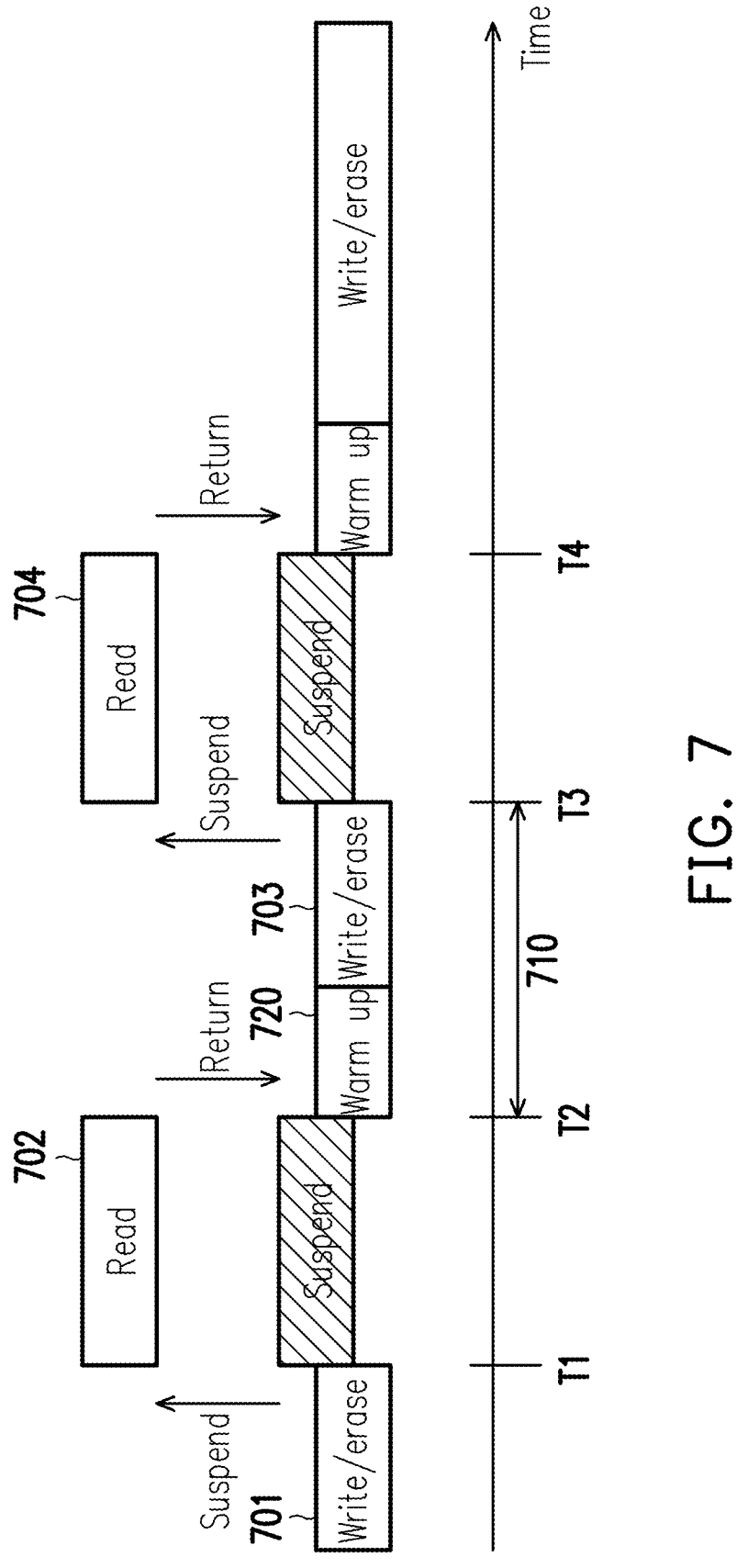
FIG. 7 is a timing diagram of executing a suspend command according to an embodiment of the disclosure.

FIG. 7 is a timing diagram of executing a suspend command according to an embodiment of the disclosure. Please refer to FIG. 7. Before a time point T1, the rewritable non-volatile memory module 43 executes an operation 701. The operation 701 may be a write operation or an erase operation. At the time point T1, the memory management circuit 51 issues a suspend command to the rewritable non-volatile memory module 43, so that the rewritable non-volatile memory module 43 suspends the currently executed operation 701 to execute a read operation 702.

At a time point T2, the read operation 702 ends, and the rewritable non-volatile memory module 43 must first go through a warm-up time 720 before returning to an operation 703, wherein the operation 703 is configured to continue unfinished work of the operation 701. For example, if the operation 701 is the write operation, and not all data is written to the rewritable non-volatile memory module 43 when the operation 701 is suspended, the remaining data is continued to be written in the operation 703. Alternatively, if the operation 701 is the erase operation, the operation 703 is configured to complete unfinished erasure of the operation 701.

At a time point T3, the memory management circuit 51 issues a suspend command to the rewritable non-volatile memory module 43 again. Therefore, the rewritable non-volatile memory module 43 must suspend the operation 703 and prioritize executing a read operation 704. At a time point T4, the read operation 704 ends, and after the warm-up time, the rewritable non-volatile memory module 43 continues the write operation or the erase operation.

The memory management circuit 51 may set a suspend interval 710 between two suspend commands. A time interval between the rewritable non-volatile memory module 43 ending the read operation 702 and receiving the next suspend command must be longer than or equal to the suspend interval 710. In other words, every time the memory management circuit 51 issues a suspend command and the corresponding read operation is completed, the memory management circuit 51 must wait for the suspend interval 710 before issuing the next suspend command.

The suspend interval 710 may correspond to the write operation or the erase operation. When the operation 701 is the write operation, the suspend interval 710 is also referred to as a write suspend interval. When the operation 701 is the erase operation, the suspend interval 710 is also referred to as an erase suspend interval. In some embodiments, the write suspend interval and the erase suspend interval are respectively two values, and the memory management circuit 51 may independently adjust the two values. The timing diagram of FIG. 7 may be applied to the write operation and the erase operation, so there is no repeated illustration.

Figure 8:
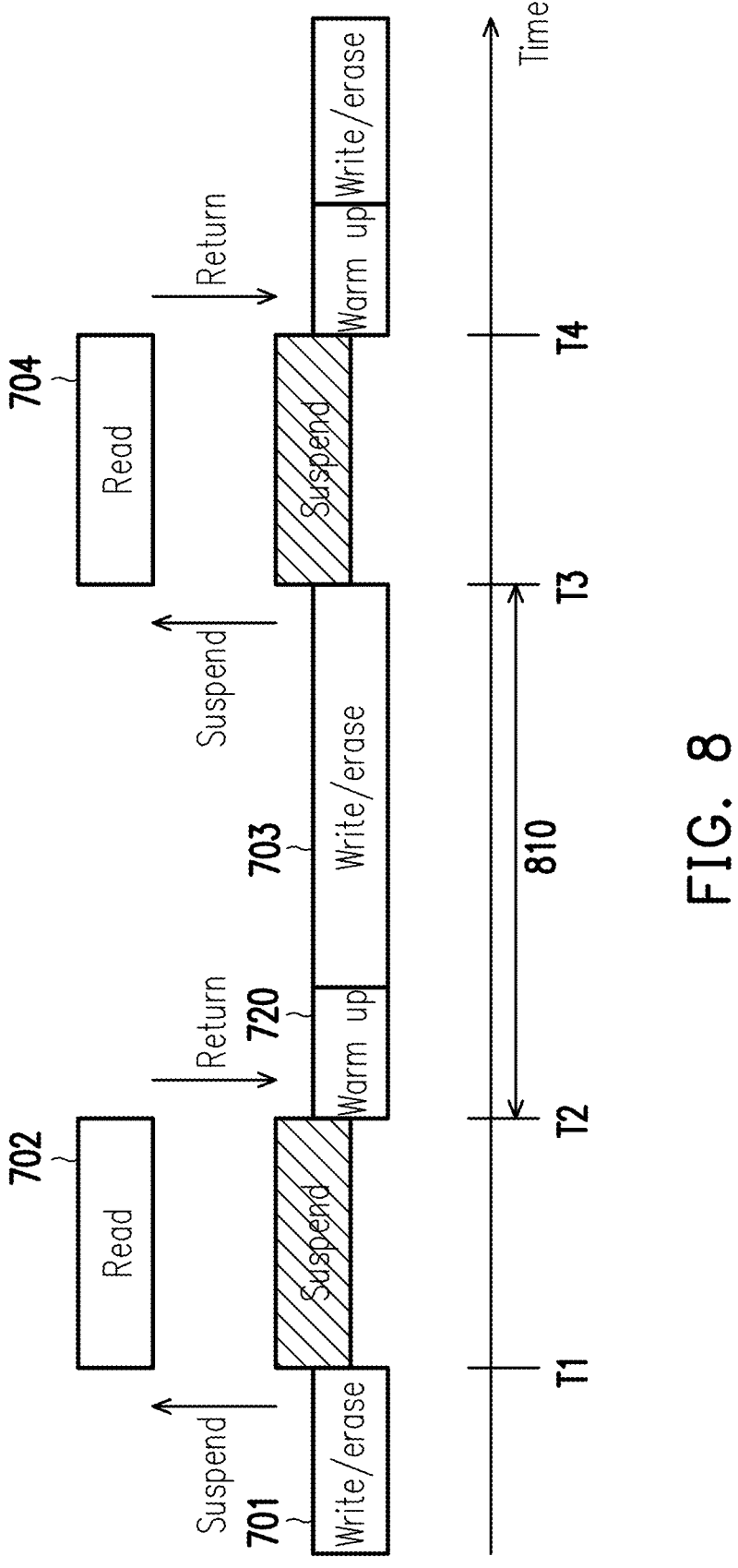
FIG. 8 is a timing diagram when a suspend interval is relatively long according to an embodiment of the disclosure.

When the suspend interval 710 is relatively short, the rewritable non-volatile memory module 43 is more likely to be suspended and prioritize executing the read operation. Therefore, latency of reading commands for the host system 11 is shortened, which increases the time for the erase or write operation. On the contrary, when the suspend interval 710 is relatively long, the rewritable non-volatile memory module 43 is less likely to be suspended, so the erase or write operation is completed more quickly, and the latency of reading the commands for the host system 11 is longer. For example, FIG. 8 is a timing diagram when a suspend interval is relatively long according to an embodiment of the disclosure. Please refer to FIG. 8. A suspend interval 810 set in FIG. 8 is longer than the suspend interval 710 set in FIG. 7, and the order of the remaining operations does not change. In the embodiment of FIG. 8, the time interval between the two read operations 702 and 704 is longer, and the latency of reading the commands for the host system 11 increases.

Variables are used here to discuss the time required for the read operation and the erase operation. Assuming that there is no suspend command, the rewritable non-volatile memory module 43 needs a time length $T_E$ to complete the erase operation. Under such a setting, if the read operation collides with the erase operation, the time length $T_E$ plus time for direct memory access (DMA) need to be to waited, that is, the latency of reading the commands is longer than or equal to the time length $T_E$. On the other hand, executing the read operation 702 requires a time length $T_R$, which includes time for reading data from the rewritable non-volatile memory module 43 plus the time for direct memory access. The length of the warm-up time 720 is $T_W$, and the length of the suspend interval 710 is $T_S$. In the embodiment of FIG. 7, time required to complete the erase operation increases to $T_E+2*T_R+2*T_W$, and the latency of reading the commands becomes $T_S+T_R$, which is shorter than $T_E$. The above time calculation for the erase operation may also be applied to the write operation, which will not be repeated here.

In the prior art, the suspend interval 710 is a fixed value. However, in the embodiment, the memory management circuit 51 may first judge a load level of the rewritable non-volatile memory module 43, and determine the suspend interval 710 between multiple suspend commands according to the load level. After determining the suspend interval, the memory management circuit 51 may sequentially issue the suspend commands to the rewritable non-volatile memory module 43 according to the suspend interval. As mentioned above, the size of the suspend interval affects the speed of completing the read operation and also affects the time required for the erase operation or the write operation. The memory management circuit 51 may dynamically determine the suspend interval according to the current state of the system.

In some embodiments, the load level of the rewritable non-volatile memory module 43 may be divided into heavy load and light load. Generally speaking, the time required for the read operation is usually relatively short (and the read operation may be executed with priority through the suspend command), and the time required for the write operation and the erase operation is usually relatively long. Therefore, when the load level of the rewritable non-volatile memory module 43 is the heavy load, accumulated unfinished operations are mostly the write operations or the erase operations. At this time, the memory management circuit 51 increases the suspend interval, so that the write operation or the erase operation is less likely to be suspended. On the contrary, when the load level of the rewritable non-volatile memory module 43 is the light load, even if the rewritable non-volatile memory module 43 is frequently suspended, the write operations or the erase operations can still be processed, so the memory management circuit 51 reduces the suspend interval to quickly complete the read operation. When the read operation is quickly completed, the latency of reading the commands for the host system 11 is reduced, so the host system 11 may issue more commands, which increases the overall performance of the memory storage device 10. Several examples will be given below to illustrate how to measure the load level.

When the host system 11 issues a write command to the memory management circuit 51, the memory management circuit 51 stores the write command (including data to be written) in the buffer memory 55, and then reports to the host system 11 that the write command is completed. Afterwards, the memory management circuit 51 issues a write command sequence to the rewritable non-volatile memory module 43 to write the data in the buffer memory 55 to the rewritable non-volatile memory module 43. Since the write operation may trigger the erase operation, if the erase operation is executed for too long, many write commands will be temporarily stored in the buffer memory 55 and cannot be executed. Therefore, in some embodiments, the erase suspend interval may be determined according to a free memory space in the buffer memory 55. Specifically, when the free memory space of the buffer memory 55 is greater than or equal to a first buffer threshold, the load level is judged to be the light load, so the memory management circuit 51 reduces the erase suspend interval. If the write commands in the buffer memory 55 gradually increase such that the free memory space of the buffer memory 55 is less than or equal to a second buffer threshold, the load level is judged to be the heavy load. At this time, the memory management circuit 51 increases the erase suspend interval to speed up the execution of the erase operation. The second buffer threshold is less than the first buffer threshold. The two buffer thresholds may be percentages of the memory space in the buffer memory 55. For example, the first buffer threshold may be 10%, and the second buffer threshold may be 2%, and the disclosure is not limited thereto. In some embodiments, if the free memory space of the buffer memory 55 is less than the first buffer threshold and greater than the second buffer threshold, the memory management circuit 51 maintains the suspend interval unchanged.

The memory management circuit 51 manages a command queue. After the host system 11 issues a command to the memory management circuit 51, the memory management circuit 51 adds the command to the command queue. The memory management circuit 51 may determine the load level according to an occupancy rate of the command queue, thereby determining the write suspend interval, wherein the occupancy rate refers to what percentage of the space in the command queue is occupied by commands. Specifically, when the occupancy rate of the command queue is greater than a first queue threshold, the load level is judged to be the heavy load, so the memory management circuit 51 increases the write suspend interval. When the occupancy rate of the command queue is less than a second queue threshold, the load level is judged to be the light load, so the memory management circuit 51 reduces the write suspend interval. The first queue threshold may be greater than or equal to the second queue threshold.

In some embodiments, the load level may also be determined according to a write speed of the host system 11. When the rewritable non-volatile memory module 43 processes many write operations, the load is greater. At this time, the write speed of the host system 11 is high, so the write suspend interval should be increased, so that the rewritable non-volatile memory module 43 may quickly execute the write operation. Specifically, the memory management circuit 51 first calculates the write speed of the host system 11. If the write speed is less than a first write speed threshold, the memory management circuit 51 judges that the load level is the light load, so the write suspend interval is reduced. If the write speed is greater than a second write speed threshold, the memory management circuit 51 judges that the load level is the heavy load, so the write suspend interval is increased. The first write speed threshold may be less than or equal to the second write speed threshold.

In some embodiments, the judgement of the load level and the correspondingly adjusted suspend interval may be arbitrarily combined. For example, in an embodiment, the write suspend interval may be determined according to the free memory space in the buffer memory 55, the erase suspend interval may be determined according to the occupancy rate of the command queue, and the erase suspend interval may be determined according to the write speed of the host system 11. Alternatively, the suspend interval may be increased based on one load level and reduced based on another load level.

The host system 11 also manages a command queue. Read commands, write commands, etc. generated by the host system 11 are all added to the command queue. A queue depth (QD) of the command queue affects the load level of the rewritable non-volatile memory module 43. When the queue depth is larger, the load of the rewritable non-volatile memory module 43 is higher. On the contrary, when the queue depth is smaller, the load of the rewritable non-volatile memory module 43 is lower. In the embodiment, the suspend interval is dynamically adjusted, so the embodiment may be applied to the host system 11 with different queue depths.

Figure 9:
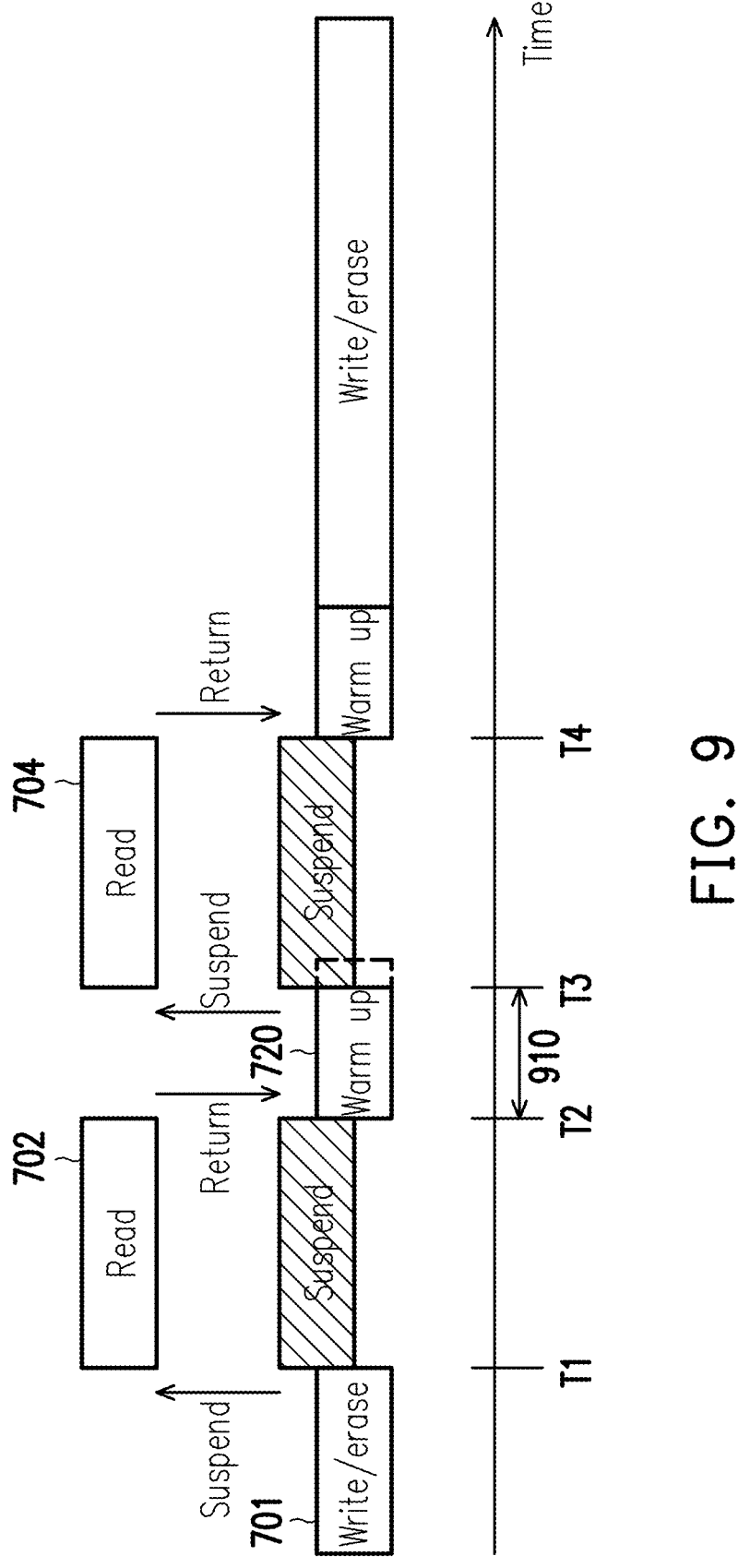
FIG. 9 is a timing diagram of a suspend interval shorter than a warm-up time according to an embodiment of the disclosure.

In some embodiments, the suspend interval (which may be the write suspend interval or the erase suspend interval) has an upper limit and a lower limit, and the memory management circuit 51 adjusts the suspend interval within the value range. In some embodiments, the lower limit of the suspend interval may be lower than the warm-up time 720 shown in FIG. 7 and FIG. 8. For example, FIG. 9 is a timing diagram of a suspend interval shorter than a warm-up time according to an embodiment of the disclosure. Please refer to FIG. 9. A suspend interval 910 set here is shorter than the original warm-up time. Therefore, the memory management circuit 51 may issue another suspend command at the time point T3. At this time, the warm-up procedure not yet ends, and the rewritable non-volatile memory module 43 needs to be suspended again to execute the read operation 704. Such a setting leaves no time to execute the erase or write operation between the two read operations 702 and 704, but the setting is reasonable in some situations. For example, when the number of read commands issued by the host system 11 is greater than the number of write commands, it becomes more important to prioritize completing the read commands first. Setting the suspend interval 910 to be less than the warm-up time 720 may quickly complete the read commands and reduce the latency of the read commands, which can actually improve the overall performance.

Figure 10:
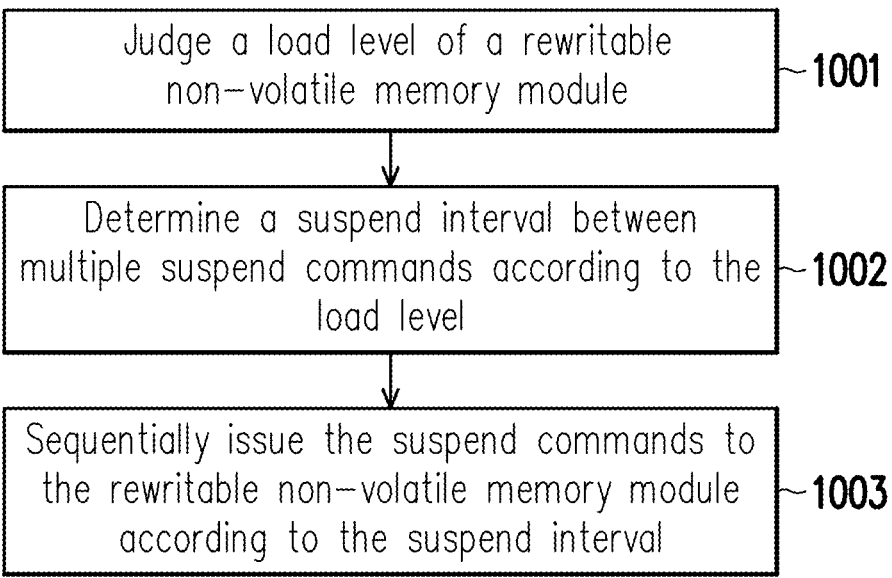
FIG. 10 is a flowchart of a memory control method according to an embodiment of the disclosure.

FIG. 10 is a flowchart of a memory control method according to an embodiment of the disclosure. Please refer to FIG. 10. In step 1001, a load level of a rewritable non-volatile memory module is judged. In step 1002, a suspend interval between multiple suspend commands is determined according to the load level. In step 1003, the suspend commands are sequentially issued to the rewritable non-volatile memory module according to the suspend interval. Each step in FIG. 10 has been described in detail above and will not be repeated here. It is worth noting that each step in FIG. 10 may be implemented as multiple program codes or circuits, and the disclosure is not limited thereto. In addition, the method of FIG. 10 may be used in conjunction with the above embodiments or may be used alone. In other words, other steps may also be added between the steps of FIG. 10.

In the technical means disclosed above, the suspend interval is dynamically determined according to the load level of the rewritable non-volatile memory module, so that the latency of reading commands under the light load may be reduced, which can improve the overall performance of the system.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. A memory control method for a rewritable non-volatile memory module, wherein the rewritable non-volatile memory module comprises a plurality of physical units, the memory control method comprising:

judging a load level of the rewritable non-volatile memory module;

determining a suspend interval between a plurality of suspend commands according to the load level; and sequentially issuing the suspend commands to the rewritable non-volatile memory module according to the suspend interval, wherein the suspend commands are configured to suspend an operation currently executed by the rewritable non-volatile memory module to execute a read operation, wherein a time interval from an end of the read operation to receiving a next one of the suspend commands is longer than or equal to the suspend interval.

2. The memory control method according to claim 1, further comprising:

judging whether the load level of the rewritable non-volatile memory module is a light load or a heavy load, wherein the step of determining the suspend interval between the suspend commands according to the load level comprises:

if the load level is the light load, reducing the suspend interval; and if the load level is the heavy load, increasing the suspend interval.

3. The memory control method according to claim 2, wherein the operation is an erase operation, the suspend interval is an erase suspend interval, and the step of judging whether the load level of the rewritable non-volatile memory module is the light load or the heavy load comprises:

receiving a write command from a host system, and storing the write command in a buffer memory;

when a free memory space of the buffer memory is greater than or equal to a first buffer threshold, judging the load level to be the light load; and when the free memory space of the buffer memory is less than or equal to a second buffer threshold, judging the load level to be the heavy load, wherein the second buffer threshold is less than the first buffer threshold.

4. The memory control method according to claim 3, further comprising:

when the free memory space of the buffer memory is less than the first buffer threshold and greater than the second buffer threshold, maintaining the suspend interval unchanged.

5. The memory control method according to claim 2, wherein the operation is a write operation, the suspend interval is a write suspend interval, and the step of judging whether the load level of the rewritable non-volatile memory module is the light load or the heavy load comprises:

receiving a command from a host system, and adding the command to a command queue;

if an occupancy rate of the command queue is greater than a first queue threshold, judging the load level to be the heavy load; and if the occupancy rate of the command queue is less than a second queue threshold, judging the load level to be the light load.

6. The memory control method according to claim 2, wherein the operation is a write operation, the suspend interval is a write suspend interval, and the step of judging whether the load level of the rewritable non-volatile memory module is the light load or the heavy load comprises:

calculating a write speed of a host system;

if the write speed is less than a first write speed threshold, judging the load level to be the light load; and if the write speed is greater than a second write speed threshold, judging the load level to be the heavy load.

7. The memory control method according to claim 1, wherein when the rewritable non-volatile memory module returns to the operation from one of the suspend commands, the rewritable non-volatile memory module executes the operation after a warm-up time, the memory control method further comprising:

in response to a number of a plurality of read commands issued by a host system being greater than a number of a plurality of write commands, setting the suspend interval to be shorter than the warm-up time.

8. A memory storage device, comprising:

a connection interface unit, configured to couple to a host system;

a rewritable non-volatile memory module, wherein the rewritable non-volatile memory module comprises a plurality of physical units; and a memory control circuit unit, coupled to the connection interface unit and the rewritable non-volatile memory module, wherein the memory control circuit unit is configured to execute a plurality of steps of:

judging a load level of the rewritable non-volatile memory module;

determining a suspend interval between a plurality of suspend commands according to the load level; and sequentially issuing the suspend commands to the rewritable non-volatile memory module according to the suspend interval, wherein the suspend commands are configured to suspend an operation currently executed by the rewritable non-volatile memory module to execute a read operation, wherein a time interval from an end of the read operation to receiving a next one of the suspend commands is longer than or equal to the suspend interval.

9. The memory storage device according to claim 8, wherein the steps further comprise:

judging whether the load level of the rewritable non-volatile memory module is a light load or a heavy load, wherein the step of determining the suspend interval between the suspend commands according to the load level comprises:

if the load level is the light load, reducing the suspend interval; and if the load level is the heavy load, increasing the suspend interval.

10. The memory storage device according to claim 9, wherein the operation is an erase operation, the suspend interval is an erase suspend interval, and the step of judging whether the load level of the rewritable non-volatile memory module is the light load or the heavy load comprises:

receiving a write command from the host system, and storing the write command in a buffer memory;

when a free memory space of the buffer memory is greater than or equal to a first buffer threshold, judging the load level to be the light load; and when the free memory space of the buffer memory is less than or equal to a second buffer threshold, judging the load level to be the heavy load, wherein the second buffer threshold is less than the first buffer threshold.

11. The memory storage device according to claim 10, wherein the steps further comprise:

when the free memory space of the buffer memory is less than the first buffer threshold and greater than the second buffer threshold, maintaining the suspend interval unchanged.

12. The memory storage device according to claim 9, wherein the operation is a write operation, the suspend interval is a write suspend interval, and the step of judging whether the load level of the rewritable non-volatile memory module is the light load or the heavy load comprises:

receiving a command from the host system, and adding the command to a command queue;

if an occupancy rate of the command queue is greater than a first queue threshold, judging the load level to be the heavy load; and if the occupancy rate of the command queue is less than a second queue threshold, judging the load level to be the light load.

13. The memory storage device according to claim 9, wherein the operation is a write operation, the suspend interval is a write suspend interval, and the step of judging whether the load level of the rewritable non-volatile memory module is the light load or the heavy load comprises:

calculating a write speed of the host system;

if the write speed is less than a first write speed threshold, judging the load level to be the light load; and if the write speed is greater than a second write speed threshold, judging the load level to be the heavy load.

14. The memory storage device according to claim 8, wherein when the rewritable non-volatile memory module returns to the operation from one of the suspend commands, the rewritable non-volatile memory module executes the operation after a warm-up time, and the steps further comprise:

in response to a number of a plurality of read commands issued by the host system being greater than a number of a plurality of write commands, setting the suspend interval to be shorter than the warm-up time.

15. A memory control circuit unit, configured to control a rewritable non-volatile memory module, wherein the rewritable non-volatile memory module comprises a plurality of physical units, and the memory control circuit unit comprises:

a host interface, configured to couple to a host system;

a memory interface, configured to couple to the rewritable non-volatile memory module;

a memory management circuit, coupled to the host interface and the memory interface, wherein the memory management circuit is configured to execute a plurality of steps of:

judging a load level of the rewritable non-volatile memory module;

determining a suspend interval between a plurality of suspend commands according to the load level; and sequentially issuing the suspend commands to the rewritable non-volatile memory module according to the suspend interval, wherein the suspend commands are configured to suspend an operation currently executed by the rewritable non-volatile memory module to execute a read operation, wherein a time interval from an end of the read operation to receiving a next one of the suspend commands is longer than or equal to the suspend interval.

16. The memory control circuit unit according to claim 15, wherein the steps further comprise:

judging whether the load level of the rewritable non-volatile memory module is a light load or a heavy load, wherein the step of determining the suspend interval between the suspend commands according to the load level comprises:

if the load level is the light load, reducing the suspend interval; and if the load level is the heavy load, increasing the suspend interval.

17. The memory control circuit unit according to claim 16, wherein the operation is an erase operation, the suspend interval is an erase suspend interval, and the step of judging whether the load level of the rewritable non-volatile memory module is the light load or the heavy load comprises:

receiving a write command from the host system, and storing the write command in a buffer memory;

when a free memory space of the buffer memory is greater than or equal to a first buffer threshold, judging the load level to be the light load; and when the free memory space of the buffer memory is less than or equal to a second buffer threshold, judging the load level to be the heavy load, wherein the second buffer threshold is less than the first buffer threshold.

18. The memory control circuit unit according to claim 17, wherein the steps further comprise:

when the free memory space of the buffer memory is less than the first buffer threshold and greater than the second buffer threshold, maintaining the suspend interval unchanged.

19. The memory control circuit unit according to claim 16, wherein the operation is a write operation, the suspend interval is a write suspend interval, and the step of judging whether the load level of the rewritable non-volatile memory module is the light load or the heavy load comprises:

receiving a command from the host system, and adding the command to a command queue;

if an occupancy rate of the command queue is greater than a first queue threshold, judging the load level to be the heavy load; and if the occupancy rate of the command queue is less than a second queue threshold, judging the load level to be the light load.

20. The memory control circuit unit according to claim 16, wherein the operation is a write operation, the suspend interval is a write suspend interval, and the step of judging whether the load level of the rewritable non-volatile memory module is the light load or the heavy load comprises:

calculating a write speed of the host system;

if the write speed is less than a first write speed threshold, judging the load level to be the light load; and if the write speed is greater than a second write speed threshold, judging the load level to be the heavy load.

21. The memory control circuit unit according to claim 15, wherein when the rewritable non-volatile memory module returns to the operation from one of the suspend commands, the rewritable non-volatile memory module executes the operation after a warm-up time, and the steps further comprise:

in response to a number of a plurality of read commands issued by the host system being greater than a number of a plurality of write commands, setting the suspend interval to be shorter than the warm-up time.

* * * * *